United States Patent
Watkins

(10) Patent No.: US 9,787,100 B2
(45) Date of Patent: Oct. 10, 2017

(54) MULTILEVEL POWER SUPPLY

(71) Applicant: Kabushiki Kaisha Toshiba, Tokyo (JP)

(72) Inventor: Gavin Watkins, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1122 days.

(21) Appl. No.: 13/772,633

(22) Filed: Feb. 21, 2013

(65) Prior Publication Data

US 2013/0221752 A1    Aug. 29, 2013

(30) Foreign Application Priority Data

Feb. 24, 2012  (GB) .................................. 1203281.9

(51) Int. Cl.
*H02M 3/07*  (2006.01)
*H02J 4/00*  (2006.01)
*H02M 1/00*  (2006.01)

(52) U.S. Cl.
CPC ............... *H02J 4/00* (2013.01); *H02M 3/073* (2013.01); *H02M 2001/0074* (2013.01); *Y10T 307/685* (2015.04)

(58) Field of Classification Search
CPC .. H02H 3/07; H02M 1/00; H02M 2001/0074; H02M 3/073
See application file for complete search history.

(56) References Cited

U.S. PATENT DOCUMENTS

| 4,135,235 A * | 1/1979 | Baker .................... H02M 7/483 363/132 |
| 5,602,794 A | 2/1997 | Javanifard et al. |
| 5,726,870 A | 3/1998 | Lavieville et al. |
| 5,767,735 A | 6/1998 | Javanifard et al. |

(Continued)

FOREIGN PATENT DOCUMENTS

| CN | 102324862 A | 1/2012 |
| EP | 0 720 281 A1 | 7/1996 |

(Continued)

OTHER PUBLICATIONS

Office Action dated Jun. 9, 2015 in Japanese Patent Application No. 2013-034394 (submitting English translation only).

(Continued)

*Primary Examiner* — Rexford Barnie
*Assistant Examiner* — Terrence Willoughby
(74) *Attorney, Agent, or Firm* — Oblon, McClelland, Maier & Neustadt, L.L.P.

(57) ABSTRACT

According to an embodiment there is provided a multilevel power supply comprising two power sources that share a common node, a switching arrangement, a charge storage device and an output terminal. The two power sources are configured to provide a first potential $V_1$, a second potential $V_2$ and a third potential $V_3$, wherein $V_1 > V_2 > V_3$. The switching arrangement is configured to charge the charge storage device between potentials $V_1$ and $V_3$ in a first switching state and to connect the charge storage device between potential $V_2$ and the output in a second switching state.

14 Claims, 11 Drawing Sheets

(56) References Cited

U.S. PATENT DOCUMENTS

| | | | |
|---|---|---|---|
| 5,781,473 | A | 7/1998 | Javanifard et al. |
| 7,193,390 | B2 * | 3/2007 | Nagai .................. H01M 10/44 320/103 |
| 8,319,375 | B2 * | 11/2012 | Taniuchi ................ H02J 1/102 307/29 |
| 2005/0012542 | A1 | 1/2005 | Kushima et al. |
| 2006/0244513 | A1 | 11/2006 | Yen et al. |
| 2008/0303587 | A1 | 12/2008 | Ahn |
| 2009/0051414 | A1 | 2/2009 | Pahr |
| 2012/0293253 | A1 | 11/2012 | Khlat et al. |
| 2013/0307617 | A1 | 11/2013 | Khlat et al. |

FOREIGN PATENT DOCUMENTS

| | | |
|---|---|---|
| JP | 9-98565 | 4/1997 |
| WO | WO 2011/133542 A1 | 10/2011 |

OTHER PUBLICATIONS

French Preliminary Search Report and Written Opinion dated Apr. 8, 2015 in French Patent Application No. 1351505 (with English translation of categories of cited documents).

Search Report dated Jun. 19, 2012 in United Kingdom Patent Application No. GB1203281.9.

Office Action dated Nov. 11, 2014 in Japanese Patent Application No. 2013-34394 (with English translation).

Office Action dated Mar. 18, 2014 in Japanese Patent Application No. 2013-034394 (with English translation).

M. Vasic et al "Multilevel Power supply for High Efficiency RF Amplifiers", Universidad Politecnica de Madrid, IEEE 2009, 6 pages.

Janusz A. Starzyk et al "A DC-DC Charge Pump Design Based on Voltage Doublers", IEEE Transactions on Circuits and Systems—I: Fundamental Theory and Applications, vol. 48, No. 3, Mar. 2001, 10 pages.

* cited by examiner

MULTILEVEL POWER SUPPLY

FIELD

Embodiments described herein generally relate to the field of multilevel power supplies and to methods of generating multiple power output levels.

BACKGROUND

Known multilevel power supplies suffer from a number of disadvantages including a need for complex driving signals and/or isolation networks and a need to use separate input power supplies from each other.

BRIEF DESCRIPTION OF THE DRAWINGS

Embodiment of the present invention will now be described by way of example only and with reference to the accompanying drawings, in which.

DETAILED DESCRIPTION

Figure 1:
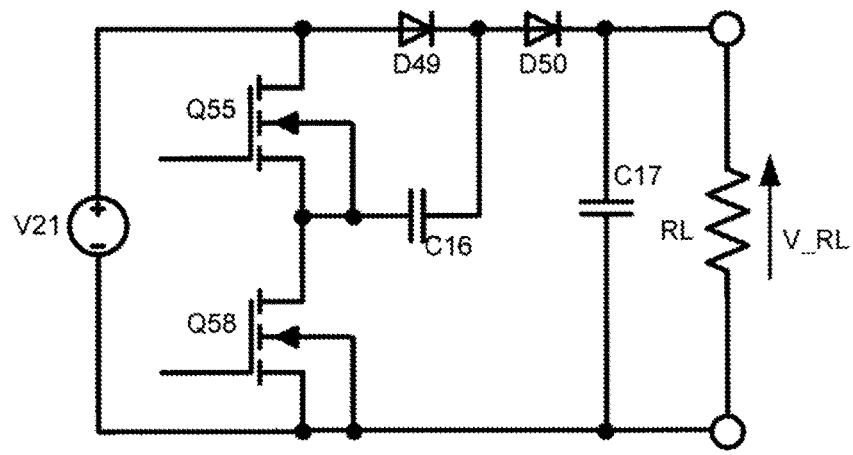
FIG. 1 shows a known charge pump voltage doubler.

According to an embodiment there is provided a multilevel power supply comprising two power sources that share a common node, a switching arrangement, a charge storage device and an output terminal. The two power sources are configured to provide a first potential $V_1$, a second potential $V_2$ and a third potential $V_3$, wherein $V_1 > V_2 > V_3$. The switching arrangement is configured to charge the charge storage device between potentials $V_1$ and $V_3$ in a first switching state and to connect the charge storage device between potential $V_2$ and the output in a second switching state.

The switching arrangement may be configured to connect the output to potential $V_2$ in a third switching state and/or to potential $V_1$ or $V_3$ in a fourth switching state.

The output may be a first stage output. The multilevel power supply may further comprise a second charge storage device with a second stage output. The switching arrangement can be configured to, in a fifth switching state, connect the second charge storage device between the first and second stage outputs when the first charge storage device is connected between potential $V_2$ and the first stage output node.

The output may be a first stage output. The multilevel power supply may further comprise a second charge storage device with a second stage output. The switching arrangement is configured to, in a fifth switching state, connect the second charge storage device for charging between the first stage output node and potential $V_1$ or potential $V_3$ when the first charge storage device is connected between potential $V_2$ and the first stage output node.

A variable attenuator may further be provided in series with the output. The attenuator may provide for an adjustable attenuation of the output voltage. An example of such a variable attenuator, to be explained below, is the element Q22 of FIG. 11. In another example, to be explained below with reference to FIG. 12, a variable attenuator such as the element Q66 is provided, and a further variable attenuator such as the element Q68 is provided between the output and a further power source V15. A driver circuit such as the driver circuit 102 of FIG. 12 can be provided to supply a driving signal to the attenuator and/or to the further attenuator for adjusting the amount of attenuation provided by the attenuator.

According to another embodiment there is provided a bipolar multilevel power supply that comprising a first multilevel power supply as described above and a second multilevel power supply as described above. The architecture of the second multilevel power supply is symmetric with the architecture of the first multilevel power supply. The potential $V_3$ of the first multilevel power supply and the potential $V_1$ of the second multilevel power supply are the same. Both these potentials may be the ground potential. The switching devices in the first and second multilevel power supplies may have opposite polarities.

According to another embodiment there is provided a bipolar multilevel power supply comprising a positive and a negative stage. Each of the positive and the negative stage comprising a multilevel power supply as described above. The bipolar multilevel power supply may further comprise a transformer with a secondary side connectable to a load. The transformer has a first, a second and a common terminal. The first terminal is connected or connectable to the output of the positive stage and the second terminal is connected or connectable to the output of the negative stage. The common terminal is connected to potential $V_1$ or $V_3$.

The switching arrangements of any of the above described multilevel power supplies can comprise MOSFETs.

The multilevel power supply may comprise a signal source configured to supply binary signals to switches within the switching device.

Figure 2:
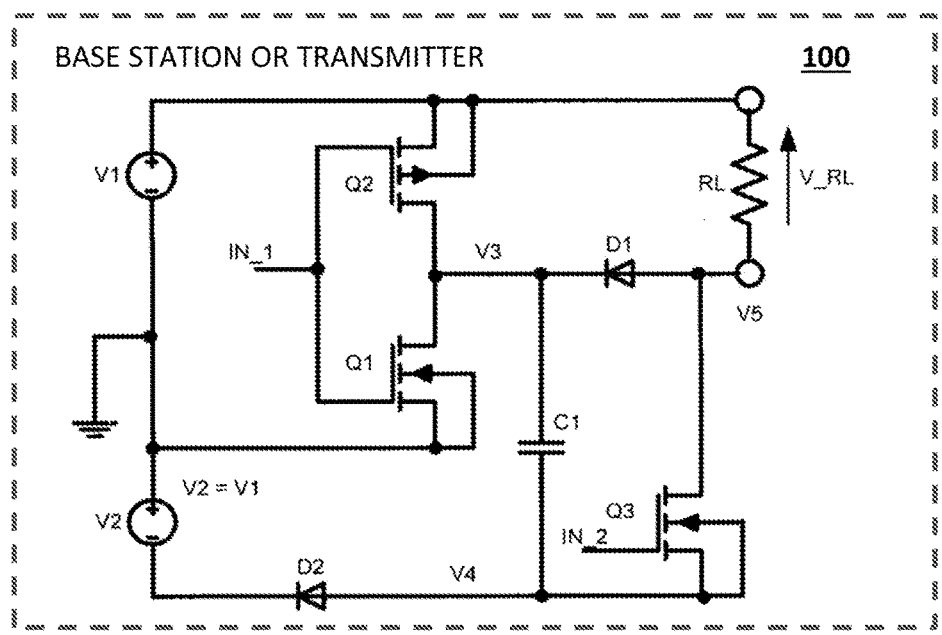
FIG. 2 shows a multilevel power supply controlled by two binary inputs.

According to an embodiment there is provided a base station or transmitter, such as the base station or transmitter 100 of FIG. 2, comprising a multilevel power supply as described above.

According to an embodiment there is provided a method of generating multiple power output levels comprising charging a first charge storage device by connecting it between a first potential $V_1$ of a first power supply and a second potential $V_3$ of a second power supply and subsequently connecting the first charge storage device between a third potential $V_2$ shared by the first and second power supply and an output, wherein $V_1 > V_2 > V_3$.

The output may be a first stage output and the method may further comprise charging, in one switching state, a second charge storage device between $V_1$ and $V_3$ and/or, in another switching state, between a potential generated at a terminal of the first charge storage device connected to the output when another terminal of the first charge storage device is connected to $V_2$ and either of $V_1$ and $V_3$ and connecting the second charge storage device in series with the first charge storage device between $V_2$ and a second stage output.

The above described embodiments are suitable for use with amplifiers intended for high PAPR modulation scheme like OFDM, for example the LTE or DVB standards, using envelope tracking and modulation. Embodiments extend to amplifiers for use in such high PAPR modulation schemes and that comprise a multilevel power supply as described above.

FIG. 1 shows a known charge pump voltage doubler. As is know, the voltages applied to the gates of transistors Q55 and Q58 are out of phase with each other, so that, at any given point in time, only one of the two transistors Q55 and Q58 is conducting.

In a switching state where transistor Q58 is conducting and transistor Q55 is not conducting both of the capacitors C16 and C17 are in parallel to the voltage source V21. Capacitor C16 is therefore charged to the output voltage of voltage source V21 in this switching state.

In a switching state where transistor Q55 is conducting and transistor Q58 is not conducting the capacitors of C16 and C17 are switched in series. This means that the terminal capacitor C17 shares with a diode D50 is at a potential that is the sum of the voltage provided by the voltage source V21 and the voltage stored in capacitor C16. Consequently capacitor C17 is charged to twice the output voltage of voltage source V21 in this switching state after a number of initial switching cycles until sufficient charge has been passed to capacitor C17. The presence of the diode D50 prevents leakage of charges stored in capacitor C17 into capacitor C16 in the switching state where transistor Q58 is conducting and transistor Q55 is not conducting. Diode D49 disconnects the upper terminal of the capacitor C16 from the power supply when the potential of the node shared by diodes D49 and D50 exceeds the supply voltage.

Figure 3:
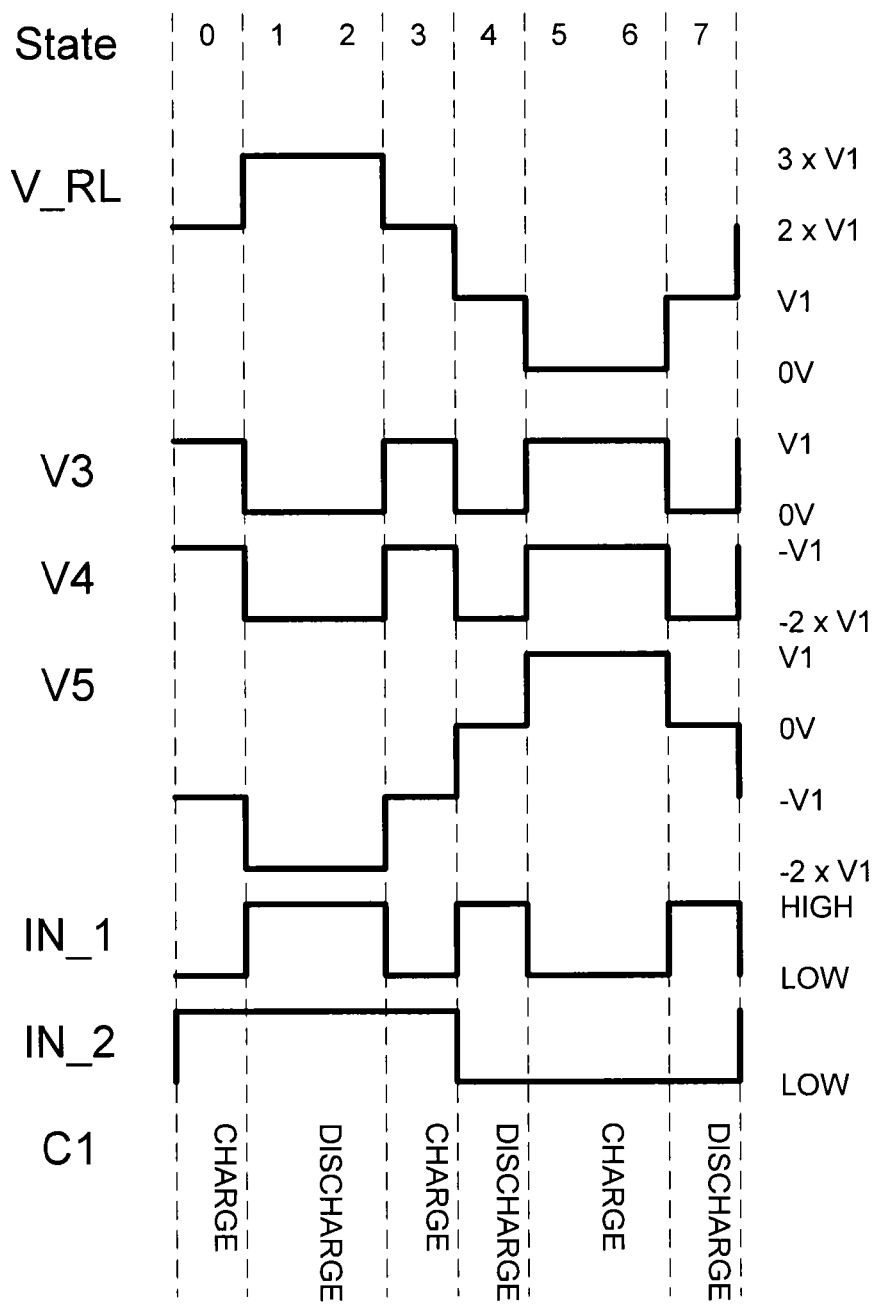
FIG. 3 shows various signal states that can occur in the power supply of FIG. 2.

FIG. 2 shows a multilevel power supply that is controlled by two binary inputs according to one embodiment. FIG. 3 illustrates the various voltage states that can be present on nodes V3, V4 and on the output node V5 depending on the input signals IN_1 and IN_2 as well as the switching state of transistors Q1, Q2 and Q3. It will of course be appreciated that the aim of the circuit shown in FIG. 2 is to generate the various output voltages indicated in FIG. 3 as being present on node V5. Generating these voltages includes charging and discharging capacitor C1. The charging and discharging states of this capacitor are shown in the last line of FIG. 3. It will moreover be appreciated that, while transistors Q1 and Q2 have different polarities and can consequently be switched using a single input signal, signal IN_1, two separate transistors with the same (or different) polarity and switched with two separate input signals may instead be used if the separate input signals are out of phase (for transistors having the same polarity; in a manner discussed above with reference to the charge pump of FIG. 1) or in phase (for transistors having opposing polarities).

Transistor Q1 is a n-channel MOSFET that conducts when input signal IN_1 is high and that does not conduct when input signal IN_1 is low. Transistor Q2 is a p-channel MOSFET that exhibits a switching behaviour opposite to that of transistor Q1. When input signal IN_1 is low transistor Q2 is conducting and transistor Q1 is not conducting. Capacitor C1 is therefore connected between the positive terminal of voltage source V1 and the negative terminal of voltage source V2 and is charged to a voltage corresponding to the sum of voltages V1 and V2 (which in the embodiment corresponds to 2*V1, given that in the embodiment V2=V1). This indicated in the last line (labelled "C1") in FIG. 3.

The output voltage achieved at node V5 during charging cycles (that is when input signal IN_1 is low) is dependent on the switching state of the second input signal, input signal IN_2. The output voltage generated for the different combination of switching states for IN_1 and IN_2 are discussed in the following.

IN_1=Low

If IN_2=High Q3 is conducting. In this case node V5 is connected to the negative terminal of voltage source V2. The output voltage at node V5 therefore corresponds to the output voltage at the negative terminal of voltage source V2. This output voltage is, in the embodiments shown, −V1. Diode D1 decouples nodes V3 and V5 from each other in this case. The voltage difference across the load resistor RL in the switching state is therefore 2*V1

If Q3 is not conducting (IN_2=Low) output node V5 is connected to the positive terminal of voltage source V1 (via diode D1), so that the output voltage provided at node V5 corresponds to the voltage at the positive terminal of voltage source V1. As a consequence a zero voltage difference is applied across the load resistor RL.

IN_1=High

When the input signal IN_1 is High transistor Q2 is non-conducting and the transistor Q1 is conducting. In this state the positive terminal of voltage source V1 is only connected to the positive output terminal, while node V3 is connected to ground. The voltage present at output node V5 is dependent on the switching state of the transistor Q3.

When transistor Q3 is conducting (IN_2=High) then node V5 is connected to the negative terminal of capacitor C1. Given that capacitor C1 has previously been charged to 2*V1 and as the positive terminal of capacitor C1 is at ground potential the output voltage at node V5 is −2*V1. The presence of diode D2 interrupts current flow to voltage source V2. In this switching state the voltage across the output load RL is 3*V1 and capacitor C1 discharges to node V5 via transistor Q3.

When transistor Q3 is not conducting (IN_2=Low) then node V5 is connected to node V3 via diode D1, so that V5 is at ground potential. Given that capacitor C1 has previously been charged to 2*V1 and as the positive terminal of capacitor C1 is at ground the potential at node V4 is more negative (at −2*V1) than the potential at the negative terminal of voltage source V2. Diode D2 consequently prevents a discharging of the capacitor C1 in this switching state. In the switching state the voltage across the output load RL is V1.

Figure 4:
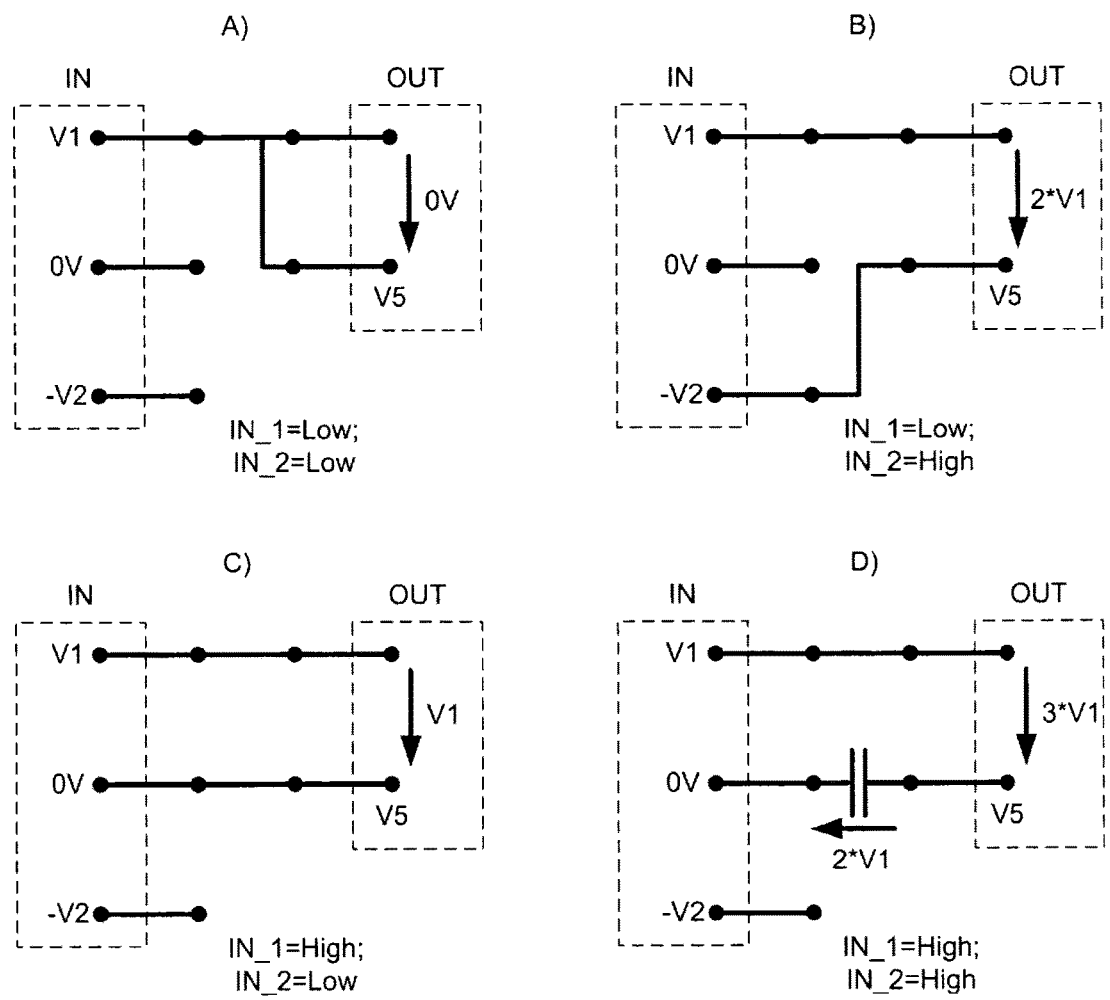
FIG. 4 further illustrates the switching states of the circuit shown in FIG. 2.

FIG. 4 provides a simplified illustration of the way the three input terminals (labelled V1, 0V and −V2 in correspondence with the respective potentials found at the respective terminals of the voltage sources shown in FIG. 2) can be connected to the two output terminals of the circuit of FIG. 2, depending on the state of the input signals IN_1 and IN_2. It will be appreciated that while FIGS. 4A), B) and C) provide at the output terminals the voltage differences that would normally be available from two series connected power supplies, the switching state shown in FIG. 4D) provides another voltage difference (3*V1) at the output that would not normally be available from a series of two voltage sources. This additional voltage output level is created because of the presence of the charge storage device (in the FIG. 2 embodiment specifically a capacitor C1, although the present disclosure should not be read as being limited to capacitive charge storage). Generating this additional output voltage level is possible because the charge storage device has been charged between V1 an −V2 before the switching state shown in FIG. 4D) is created. The charge storage device thus acts as a floating power supply.

For completeness it is pointed out that the zero Volt potential difference at the output terminals shown in FIG. 4A) could of course alternatively be achieved by connecting both output terminals to the ground potential or to the −V2 potential. The V1 potential difference shown in FIG. 4C) could equally be achieved by connecting the two output terminals to the ground potential and the −V2 potential respectively.

It will equally be appreciated that further output voltage levels other than those illustrated in FIGS. 2 to 4 can be generated by switching the charge storage device in series with a potential other than the ground potential. For example, if the charge storage device was provided in series with the positive terminal of the voltage source V1, then the potential at the positive output terminal could be boosted to 3*V1 (It will be appreciated that, in order to achieve this the lower terminal of the charge storage device of FIG. 2 would need to be connected to potential V1. Switching devices in addition to those shown in FIG. 2 would be required for this purpose). If output terminal V5 was at the same time connected to the potential −V2, then (for V2=V1) the potential difference between the two output terminals could be 4*V1).

It will moreover be appreciated that, although the circuit shown in FIG. 2 uses two voltage sources with the same voltage output (V1) this is not essential and that voltage sources with two different voltage outputs can be used instead depending the desired voltage output levels at node V5.

The use of capacitor C1 in FIG. 2 allows common power supplies to be used. This is a significant advantage compared to known cascaded power supply solutions that require separate floating power supplies. Such floating power supply sections of cascaded power supplies often require control through optic isolators. The use of optic isolators can introduce significant delay and increase power consumption. The control of the FIG. 2 power supply is, in contrast, simpler due to the use of common power supplies.

The above discussed architecture, as well as the further embodiments described in the following provide a wide bandwidth multilevel power supply that is both efficient in power consumption and the number of power supplies required.

Figure 5:
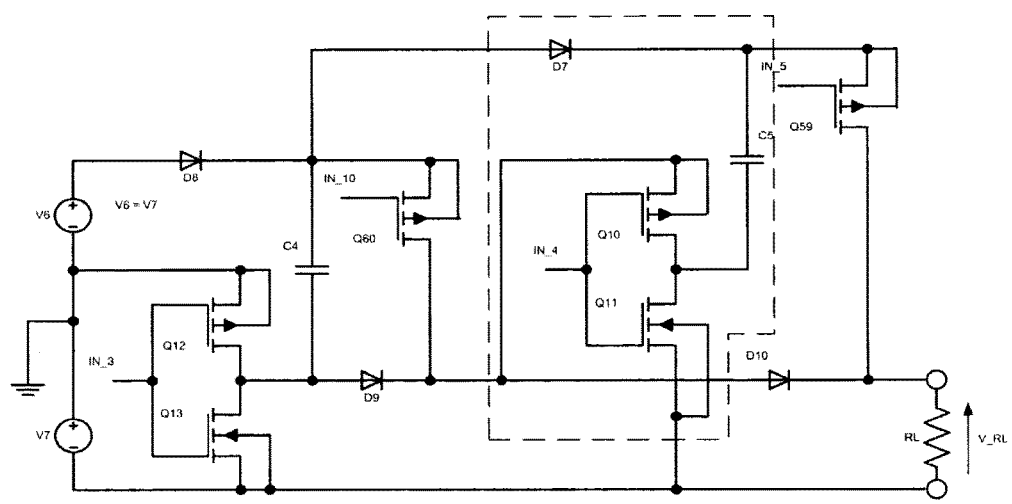
FIG. 5 shows a multilevel power supply controlled by three binary inputs.
Figure 6:
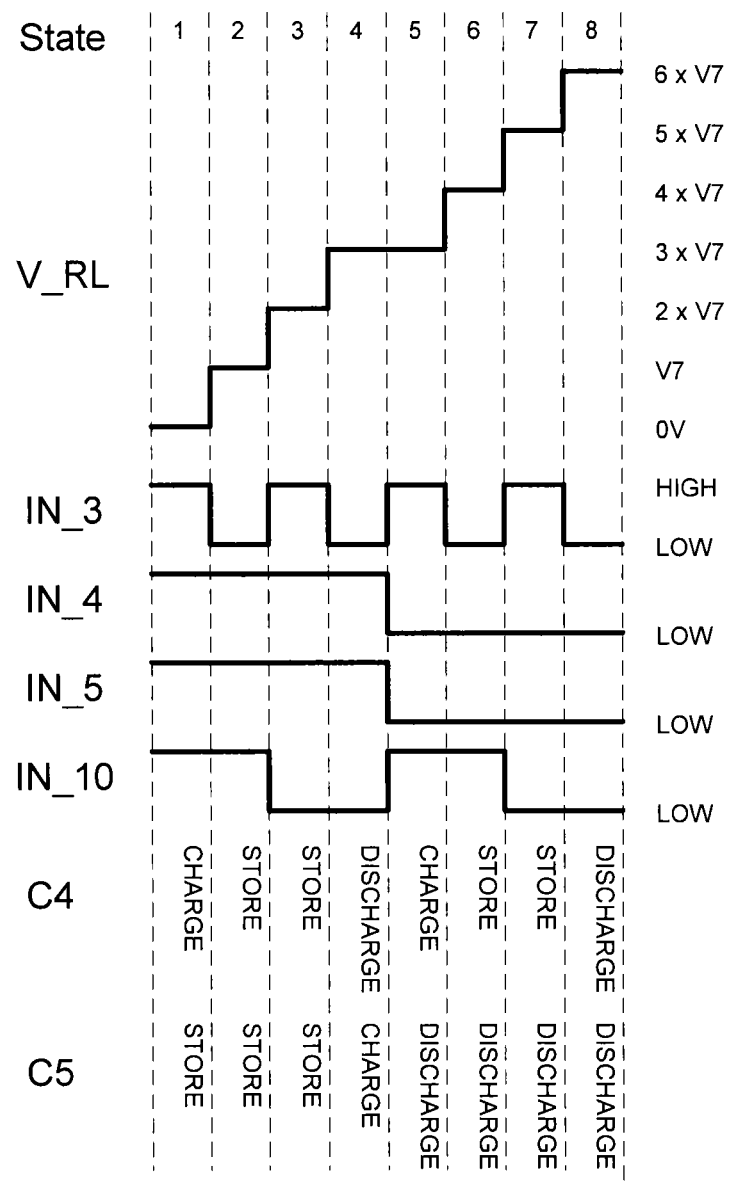
FIG. 6 shows various signal states that can occur in the power supply of FIG. 5.

While in FIG. 2 power is returned to the positive supply rail via RL, power could equally be returned to the negative supply rail if P-channel MOSFETs were used. A thus modified equivalent of the circuit shown in FIG. 2 forms the basis of the circuit shown in FIG. 5. FIG. 5 shows a version of this circuit that further comprises a cascaded further switching stages between the charge storage device (capacitor C1 in FIG. 2 and capacitor C4 in FIG. 5) and the output switching device (transistor Q3 in FIG. 2 and transistor Q59 in FIG. 5). A further switching device Q60 is provided in the circuits shown in FIG. 5 to ensure that the intermediate output voltages V6/V7 and 2*V7 that can be applied to the node shared by diodes D7 and D8, capacitor C4 and transistor Q60 can be applied to the load RL as well as the to the input node of the second switching stage, namely the node shared by the diodes D9 and D10 and the transistor Q10. FIG. 6 shows a voltage level diagram illustrating the potentials generated in the FIG. 5 circuit by various combinations of the input signals IN_3 to IN_5 and IN_10. In the circuit of FIG. 5 V6=V7 and the node connecting the two voltage sources is at ground potential. It will, however, be appreciated that the outputs of the two voltage sources do not have to be the same and/or that the shared node between the voltage sources does not have to be at ground potential.

The conductivity state of transistors Q12 and Q13 switch depends on the same input signal, IN_3. As these two transistors are of opposite polarity one transistor will be non-conductive when the other transistor is conducting. When transistor Q13 is conducting capacitor C4 is connected between the voltage +V6/+V7 and −V7 and will therefore charge to a voltage 2*V7. When transistor Q13 is switched to the non-conducing state and transistor Q12 to the conducting state the node shared by the two transistors is moved to ground potential. The voltage (2*V7) stored in capacitor V4 boosts the potential on the node shared by diode D8 and capacitor C4 to 2*V7 above ground. D8 is rendered non-conductive and prevents leakage of charges from the capacitor C4 into the voltage source V6. This operation of the circuit of FIG. 5 is analogous to the operation of the FIG. 2 circuit.

The above discussed first stage of the FIG. 5 circuit (comprising diode D8, transistors Q12 and Q13 and capacitor C4) provides four different voltages on the nodes connecting to the cascaded further switching stage (in the area outlined by dashed lines). These are V7 and 2*V7 (depending on the switching states of transistors Q12 and Q13) at the node shared by capacitor C4 and diode D8 and ground potential or −V7 (again depending on the switching states of transistors Q12 and Q13) at the node shared by transistors Q12 and Q13 and capacitor C4. A voltage of −V7 is also provided at the negative power rail.

Similar to the charging operation employed by the first stage of the FIG. 5 circuit the transistors Q10 and Q11 again charge the capacitor C5, albeit to 3*V7 when transistor Q11 is conducting but Q10 is non-conductive and if the voltage provided at the node shared by diode D8 and capacitor C4 is 2*V7.

Cascading the four power sources V6, V7, C4 and C5 allows to achieve the output voltages V_RL across the load RL indicated in the diagram of FIG. 6.

A load voltage V_RL of 0 Volt is generated if transistors Q11 and Q13 are conducting and transistors Q59 and Q60 are non-conductive (switching state 1 in FIG. 6). The node shared by capacitor C4 and diode D9 is then at a potential of −V7, as is the node shared by transistors Q10, Q11 and capacitor C5. The voltage at the upper terminal of RL is therefore −V7, giving rise to a zero voltage potential difference. In this switching state capacitor C4 is charged to a voltage difference of 2*V7.

A load voltage V_RL of V7 is generated if transistor Q12 is conducting and transistors Q59 and Q60 are non-conductive (switching state 2 in FIG. 6). In this switching state the node shared by transistors Q12, Q13, capacitor C4 and diode D9 is at ground potential, while the node shared by transistors Q10, Q11 and capacitor C5 is at potential −V7. Diodes D9 and D10 are conductive, passing the ground potential to the upper terminal of RL. The potential difference across the load RL is therefore V7. In this switching state diodes D8 is non-conductive, as the voltage stored in capacitor C4 boosts the voltage on the node shared by diodes D7 and D8, capacitor C4 and transistor Q60 to 2*V7.

A load voltage V_RL of 2*V7 is generated if transistors Q11, Q13 and Q60 are conducting and transistor Q59 is non-conductive (switching state 3 in FIG. 6). Potential V7 is applied to the upper terminal of the load RL via transistor Q60. As the anode of diode D9 is at a potential of −V7 diode D9 is non-conductive. The potential across the load RL is therefore 2*V7.

A load voltage V_RL of 3*V7 can be achieved by two different switching states, shown as states 4 and 5 in FIG. 6. In the first switching state (switching state 4 in FIG. 6) transistors Q11, Q12 and Q60 are conducting while transistor Q59 is non-conductive. The ground potential shared by the voltage sources is applied, through transistor Q12, to the node shared by the transistors Q12 and Q13 and by capacitor C4 and diode D9. The potential on the node shared by diodes D7 and D8, capacitor C4 and transistor Q60 is boosted to 2*V7 by the charges stored in capacitor C4, therefore rendering diode D8 non-conductive. This potential is passed through transistor Q60 and diode D10 to the upper terminal of the load RL, rendering diode D9 non-conductive. The potential difference V_RL across the load RL is therefore 3*V7. In this switching state the capacitor C4 is discharged. The capacitor C5 connected between the boosted voltage 2*V7 (through diode D7) and −V7 (through transistor Q11) and is therefore charged to 3*V7 by capacitor C4.

In the second switching state (switching state 5 shown in FIG. 6) transistors Q10, Q13 and Q59 are conducting, while transistor Q60 is non-conductive. In this switching state capacitor C4 is charged between voltages V7 and −V7 (through transistor Q13). The node shared by transistors Q10 and Q60 and diodes D9 and D10 is at a potential of −V7. Capacitor C5 holds a voltage of 3*V7, thus boosting the node shared between diode D7, capacitor C5 and transistor Q59 to a potential of 2*V7, rendering diode D7 non-conductive. This potential is also applied to the upper output terminal connecting to RL, rendering diode D10 non-conductive. In this switching state capacitor C4 is charged while capacitor C5 is discharged.

A load voltage V_RL of 4*V7 is achieved if transistors Q10, Q12 and Q59 are conducting and when transistor Q60 is non-conductive (switching state 6 in FIG. 6). Ground potential is applied to the node shared by capacitor C5 and transistors Q10 and Q11 through transistors Q10 and Q12 and diode D9. Capacitor C5 stores a voltage of 3*V7, thus boosting the potential at the node shared by diode D7, capacitor C5 and transistor Q59 to 3*V7. This potential is applied to the upper terminal of load RL through transistor Q59. It will be appreciated that the potential at the node shared by transistors Q12 and Q13, capacitor C4 and diode D9 is also at ground. This means that the charges stored in capacitor C4 (amounting to 2*V7 in a steady-state fully charged mode) boost the potential at the node shared by diodes D7 and D8, capacitor C4 and transistor Q10 to 2*V7, thus rendering diode D8 non-conductive. The potential 3*V7 at the node shared between diode D7, capacitor C5 and transistor Q59 renders diode D7 non-conductive in light of the 2*V7 potential at the anode of diode D7. Capacitor C4 thus can hold the stored charge, while capacitor C5 discharges in this switching state.

Load voltages of V_RL of 5*V7 and 6*V7 are generated in switching states 7 and 8 shown in FIG. 6 respectively. In both switching states transistors Q10, Q59 and Q60 are conducting. The two switching states differ from each other in that, in switching state 7 transistor Q13 is conducting while transistor Q12 is non-conductive, while in switching state 8 transistor Q12 is conducting while transistor Q13 is non-conductive.

In both switching states the potential applied to the lower terminal of capacitor C5/to the node shared by diodes D9 and D10 and transistors Q10 and Q60 is boosted by the voltage stored in capacitor C5, namely by 3*V7. The two switching states differ in the potential that is applied (via transistor Q60) to the node shared by diodes D9 and D10 and transistors Q10 and Q60. Both of the different potentials applied to this node in the two switching states result from a boosting of the potential at the node shared by transistors Q12 and Q13, capacitor C4 and diode D9. The potential at this node is boosted by the voltage stored in C4, 2*V7. In switching state 7 transistor Q13 is conducting, so that a voltage of −V7 is boosted to a voltage of V7 by capacitor C4. This voltage is in turn boosted to 4*V7 by capacitor C5, giving rise to an output potential difference of 5*V7. In switching state 8 transistor Q12 is conducting, so that the ground potential is boosted to a voltage of 2*V7 by capacitor C4. This voltage is in turn boosted to 5*V7 by capacitor C5, giving rise to an output potential difference of 6*V7.

The above description of the circuit shown in FIG. 5 charges capacitor C5 to a voltage of 3*V7. It will, however, also be appreciated that it would be possible to charge capacitor C5 to a voltage of 2*V7. In this some of the above discussed output voltages can be generated in a different manner that would be readily apparent to the person skilled in the art in view of the above discussion.

Figure 7:
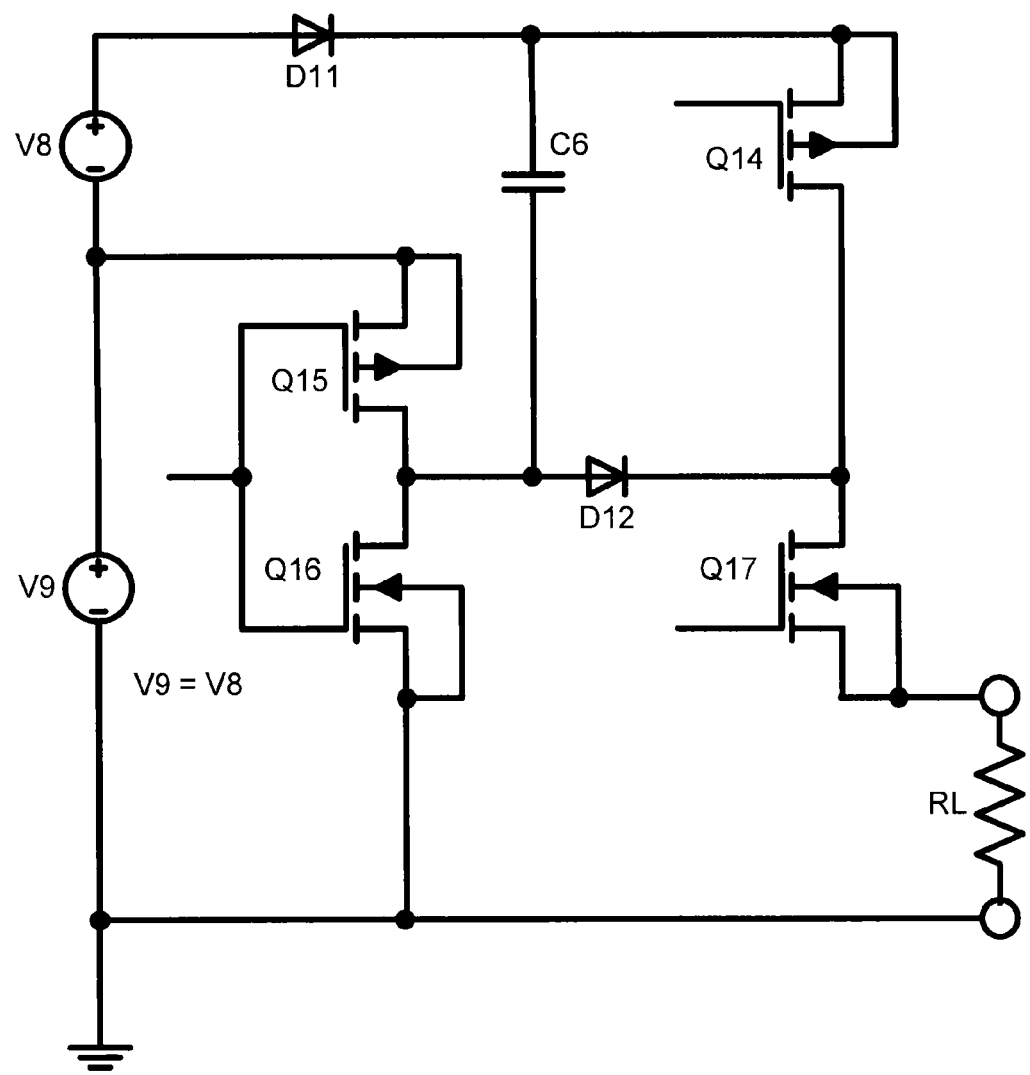
FIG. 7 shows a multilevel power supply with a ground reference and a linear series pass element.

Turning now to the circuit shown in FIG. 7, this circuit is similar to the first stage of the circuit shown in FIG. 5 (comprising transistors Q12 and Q13, diode D8 and capacitor C4) in combination with transistor Q59 but comprises an additional transistor Q17 in series with the load RL. It will be appreciated that the circuit shown in FIG. 7 is also similar to a version of the circuit shown in FIG. 2 but modified so that power is returned to the negative supply rail and further comprising the transistor Q17.

It will be appreciated that in the example circuits shown in FIGS. 2 and 5 only the discrete voltage levels shown in FIGS. 3 and 6 respectively can be applied at the output. FIG. 7 improves upon this by varying the gate voltage applied to transistor Q17 so that the voltage drop across transistor Q17 causes the voltage output across the load RL to vary smoothly. It will be appreciated that the input signal applied to the gate of transistor Q17 is not a binary signal (as is the case for IN_1 to IN_5 discussed above) but a linear analogue signal that has a signal levels arranged to cause a voltage drop across the channel of transistor Q17 that reduces a voltage applied to the node transistor Q17 shares with transistor Q14 and diode D12 to a desired output voltage V_RL.

A further difference between the circuit of FIG. 7 and both of the circuits of FIGS. 2 and 5 is that it is the negative terminal of the voltage source V9 (rather than the terminal shared by the two voltage sources) that is connected to ground. This modification is independent from the use of transistor Q17 and could equally be made in the circuits shown in FIGS. 2 and 5.

Figure 8:
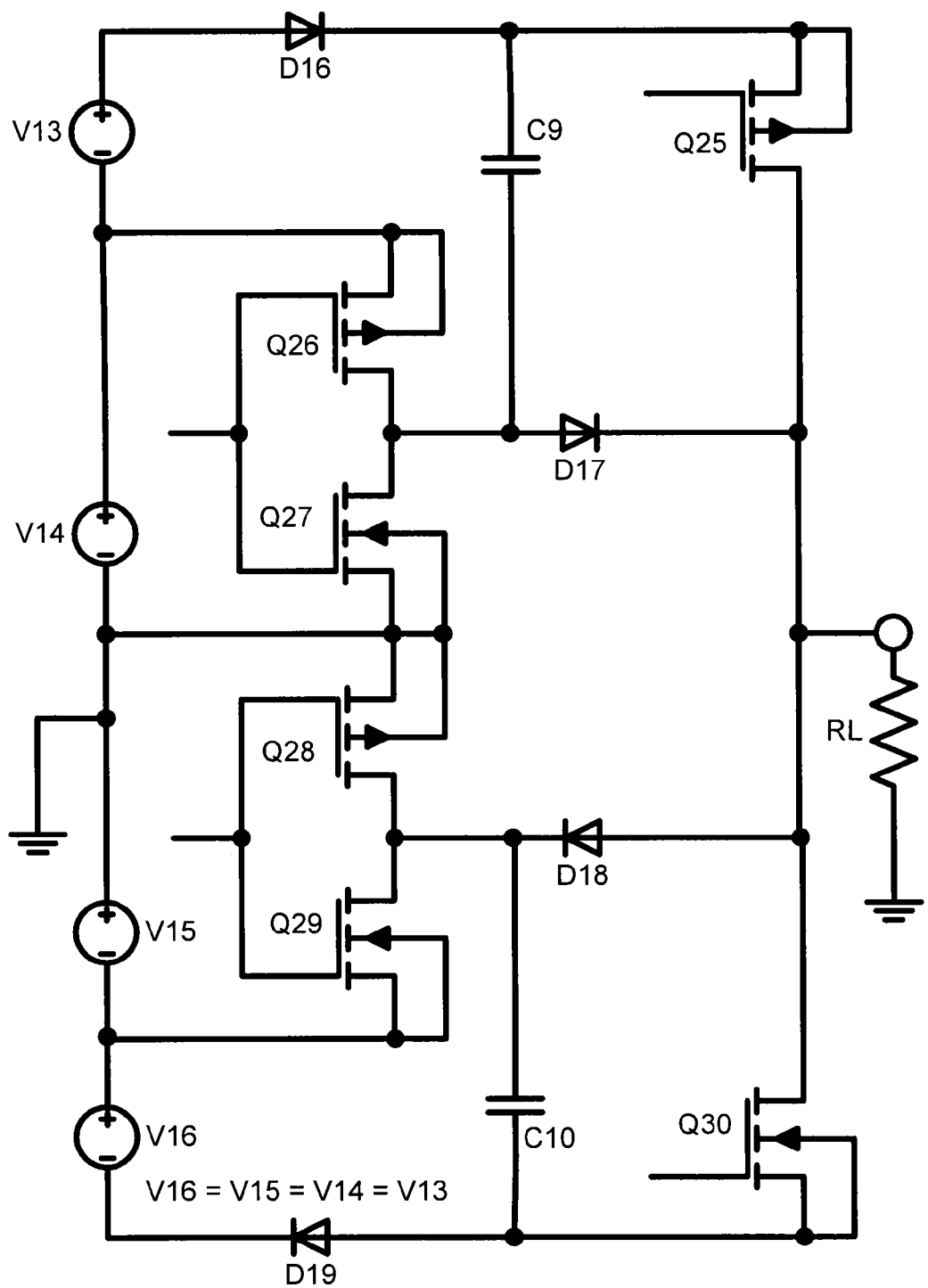
FIG. 8 shows a complementary multilevel power supply with bipolar output.

Turning now to the circuit of FIG. 8, this circuit expands the circuit shown in FIG. 7 by adding a mirrored version of the FIG. 7 circuit, wherein the polarities of the transistors are also inverted. As can be seen, the regulating transistor Q17 used in FIG. 7 has not been included in either of the two halves of the circuit shown in FIG. 8. Omission of this transistor from either half of the FIG. 8 circuit is, however, not essential if a linear signal is to be produced.

The operation of each half of the FIG. 8 circuit is the same as the operation of the circuit shown in FIG. 2 or of the equivalent parts of the circuit shown in FIG. 7. The circuit shown in FIG. 8 enables applying positive and negative voltages across the load RL. Table 1 details a range of voltages that can be applied to the load RL, alongside the required switching states of the relevant transistors.

TABLE 1

Switching states of relevant transistors for applying the output load voltages discussed in the left-hand column

| Voltage at RL | Switching Mechanism |
| --- | --- |
| 3*V16 | Connect the lower terminal of C9 to the node between V13 and V14 through transistor Q26, thereby boosting the potential at the upper terminal of C9 to 3*V16 (as C9 stores a voltage of 2*V16) Connect this potential to RL through transistor Q25 |
| 2*V16 | Connect the potential 2*V16 provided by V13 and V14 to RL through transistor Q25 |
| V16 | Connect the potential V16 at the node shared by V13 and V14 to RL through Q26 and D17. Transistors Q25 and Q30 are non-conductive. |
| 0 | Connect ground potential from the node shared by V14 and V15 to RL through Q27 and D17. Q25 and Q30 are non-conductive |
| −V16 | Connect the potential −V16 at the node shared by V15 and V16 to RL through Q29 and D18. Transistors Q25 and Q30 is non-conductive. |
| −2*V16 | Connect the potential −2*V16 provided by V15 and V16 to RL through Q30 |
| −3*V16 | Connect the upper terminal of C10 to potential −V16 through transistor Q29, thereby boosting the potential at the lower terminal of C10 to −3*V16 (as C10 stores a voltage of 2*V16) Connect this potential to RL through transistor Q30 |

The circuit of FIG. 8 relies on four binary signal inputs, two for each half circuit. It will be appreciated that not all combinations of signal inputs can be used in this circuit. The switching of the transistors does, for example, have to be performed such that only a single potential is applied to the load RL in one of the above summarised manners. Transistors required for blocking other potentials from being applied to the load RL are switched accordingly. Other transistors may be switched to enable the charging of one or both of the capacitors when the capacitors are not used for voltage boosting.

Combining P-channel and N-channel structures as shown in FIG. 8 results in a bipolar output so that both positive and negative transitions can be achieved around the ground reference. It is possible to integrate respective P-channel and N-channel series pass elements into FIG. 8 to achieve a linear output signal as detailed in FIG. 7.

Figure 9:
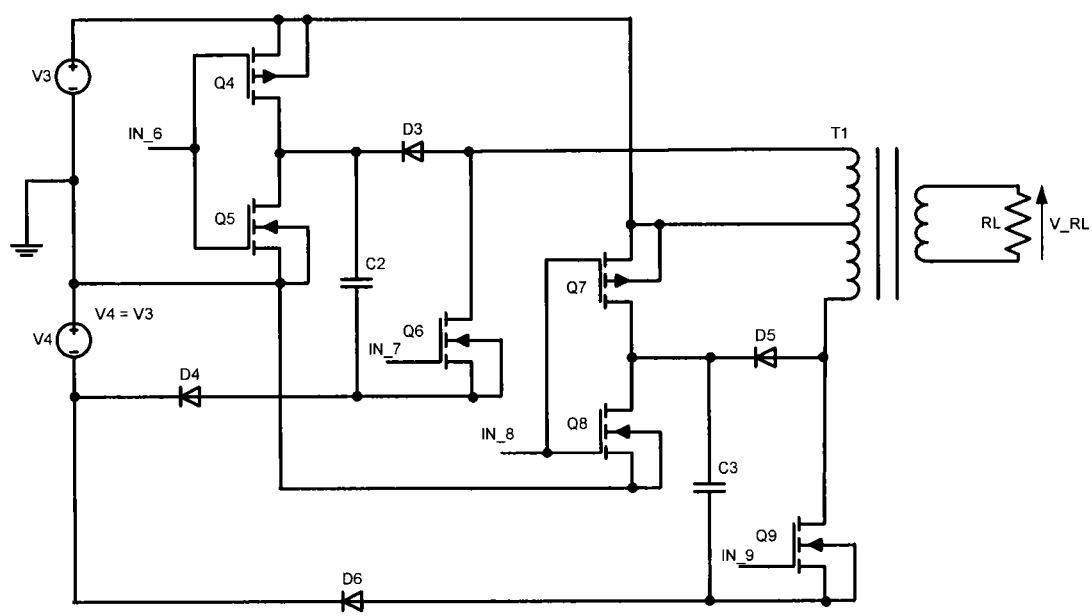
FIG. 9 shows a transformer coupled multilevel power supply with bipolar output.

It will be appreciated that the advantage of being able to provide positive and negative voltage levels is achieved in the circuit shown in FIG. 8 at the cost of having to provide four voltage sources. A further embodiment capable of applying positive as well as negative voltages to the load RL without, however, having to use four voltage sources is shown in FIG. 9. The circuit of FIG. 9 uses a transformer with two primary windings. The centre/common terminal of the primary side of this transformer is permanently connected to the potential +V3. Positive and negative voltages are induced in the secondary side of the transformer by applying either a negative potential at the upper terminal (the terminal sharing a node with diode D3 and transistor Q6) of the primary side of the transformer or a positive potential at the lower terminal (the terminal sharing a node with diode D5 and transistor Q9) of the primary side of the transformer. Only one half of the primary side of the transformer is in use at any one time.

Figure 10:
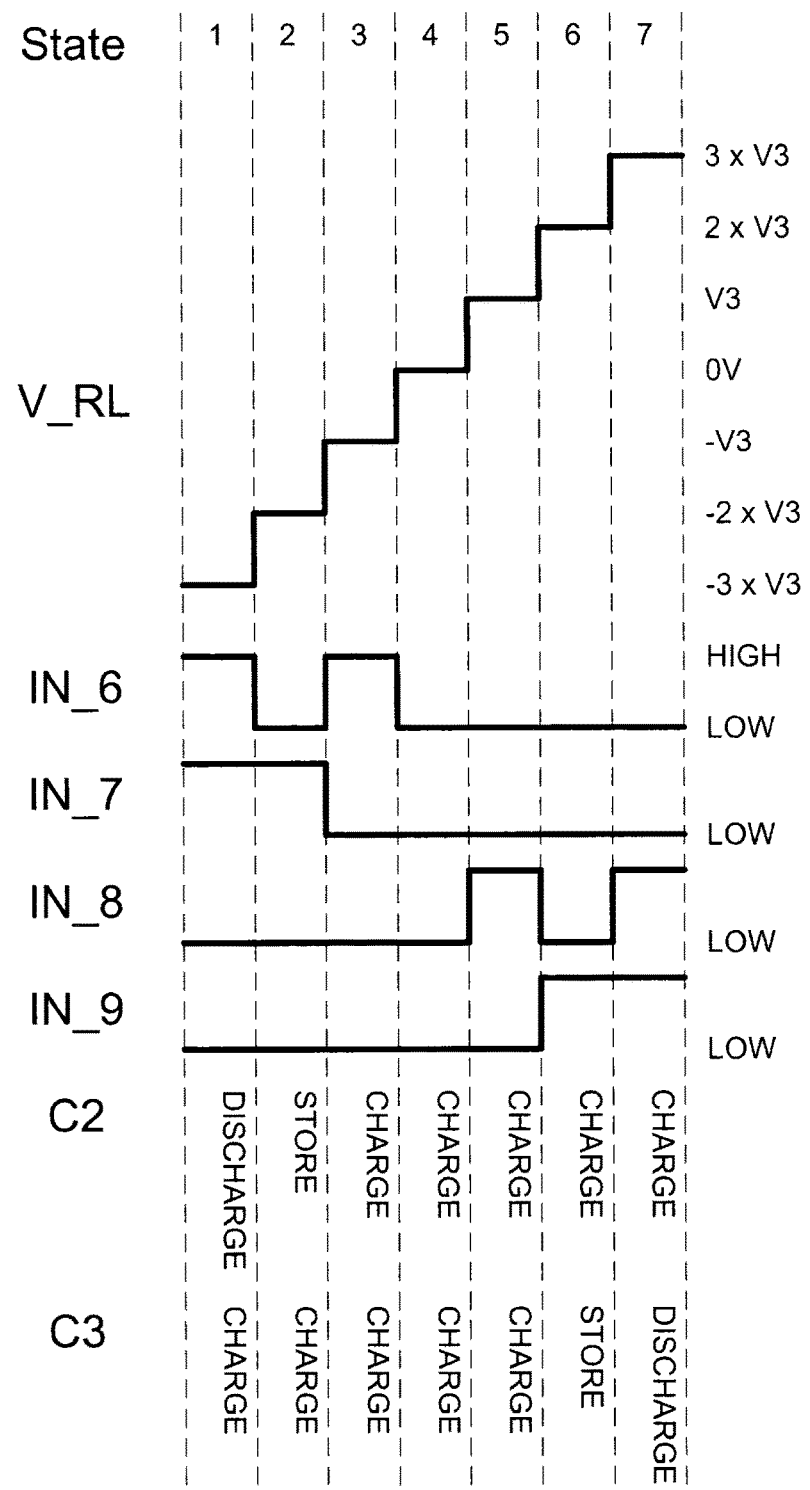
FIG. 10 shows various signal states that can occur in the power supply of FIG. 9.

In the illustrated embodiment the transformer is configured such that the two halves of the primary winding have an equal number of turns. In an embodiment each half of the primary side provides 1:1 transformation of an applied voltage to the secondary side. It will be appreciated that 1:1 transformation is, however, not essential and other ratios may be chosen, depending on the desired output voltages. If the transformer is configured so that 1:1 transformation between the primary and secondary sides is achieved, then the voltage V_RL applied to the load is the same voltage as the voltage difference applied across the half of the primary side of the transformer currently in use. The input signals applied for generating the various load voltages V_RL are shown in FIG. 10. Table 2 lists the switching states required to achieve various load voltages V_RL.

TABLE 2

Switching states of relevant transistors for applying the output load voltages discussed in the left-hand column

| Voltage at RL | Switching Mechanism |
| --- | --- |
| 3*V3 | Connect the node shared by capacitor C3, diode D5, transistors Q7 and Q8 to ground via transistor Q8, thereby boosting the potential at the node shared by capacitor C3, diode D6 and transistor Q9 to −2*V3 (as capacitor C3 stores −2*V3) Connect this potential to the lower terminal of the transformer through Q9 |
| 2*V3 | Connect the lower terminal of the transformer to −V3 through transistor Q9 and diode D6 |
| V3 | Connect the lower terminal of the transformer to ground through transistor Q8 and D5 |
| 0 | Connect the upper and the lower terminal of the transformer to +V3 through transistor Q4 and diode D3, and Q7 and D5 respectively |
| −V3 | Connect ground potential to the upper terminal of the transformer through transistor Q5 and diode D3 |
| −2*V3 | Connect potential −V3 to the upper terminal of the transformer through transistor Q6 and diode D4 |
| −3*V3 | Connect the node shared by capacitor C2, diode D3 and transistors Q4 and Q5 to ground through transistor Q5, thereby boosting the potential at the node shared by capacitor C2, diode D4 and transistor Q6 to −2*V3 (as capacitor C2 stores −2*V3) Connect this potential to the upper terminal of the transformer through transistor Q6 Diodes D3 and D4 are non-conductive in this switching state |

Figure 11:
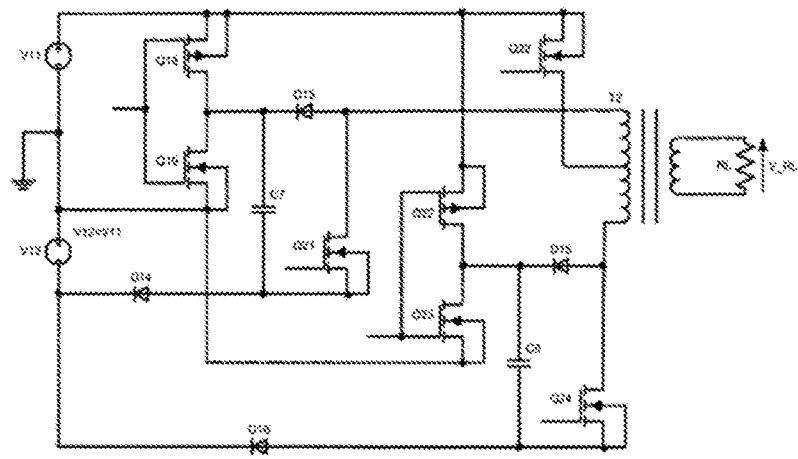
FIG. 11 shows a transformer coupled multilevel power supply with bipolar output and a linear series pass element.

FIG. 11 shows the circuit of FIG. 9, albeit including a series pass element Q22 to provide a smooth output signal in the same manner as the series pass element described above with reference to FIG. 7. It will be appreciated that transistor Q22 shown in FIG. 11 operates in class A mode. This leads to inefficiencies that may be avoided if a second transistor connected to draw current from a power supply with a lower supply voltage than the supply voltage of the two power supplies V11 and V12 was included in the circuit so as to form a class G amplifier. An example of such a circuit is shown in FIG. 12.

Figure 12:
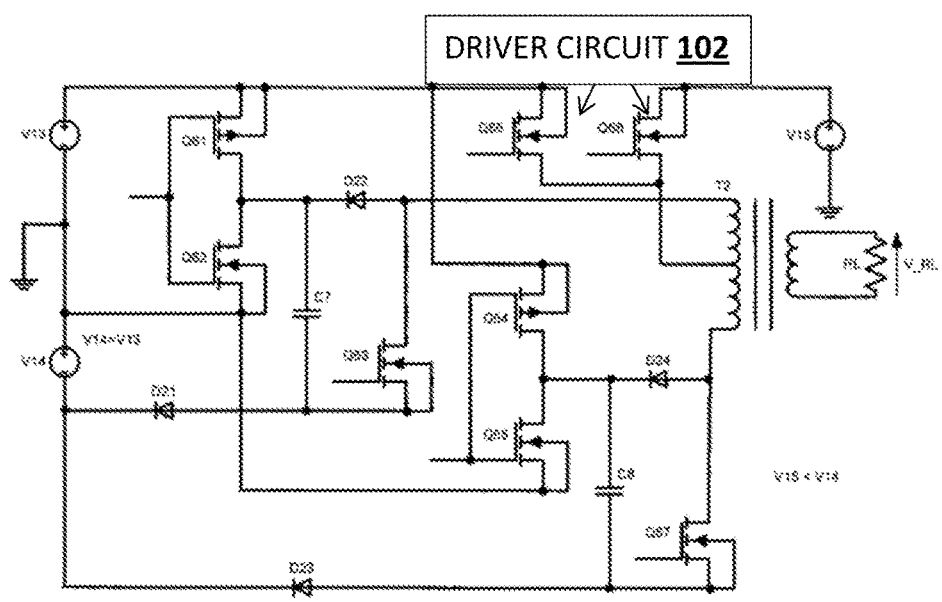
FIG. 12 shows a modification of the circuit shown in FIG. 11, wherein the linear series pass element show in FIG. 11 is replaced by a class G control element.

The potential across either of the two primary windings of the transformer shown in FIGS. 9, 11 and 12 is the difference between the voltage applied to the central terminal (this potential is V3 in the circuit shown in FIG. 9 and (due to the modifying effects of the linear series pass element Q22 used in FIG. 11) between ground and V3 in the circuit shown in FIG. 11) and the potential applied to the upper or lower terminals of the primary windings (as discussed above, these potentials are the ground potential, −V3, −2*V3 and −3*V3. The potential applied across the primary windings of the transformer of the circuit shown in FIG. 9 can therefore be expressed as $V_{primary}=V3+n*V3$, wherein n is an integer that can take the values 0, 1, 2 or 3.

The series pass element can induce a voltage drop that reduces the potential V3 applied to the central terminal of the primary winding to any potential value between the ground potential and V3. The potential applied across the primary windings of the transformer of the circuit shown in FIG. 11 can therefore be expressed as $V_{primary}=c_{V3}*V3+n*V3$, wherein n is an integer that can take the values 0, 1, 2 or 3 and wherein $c_{V3}$ is a scaling factor smaller than 1 that reflects the attenuation of the potential applied to the common terminal of the primary winding of the transformer by Q22.

It will be appreciated that the efficiency of the circuit of FIG. 11 is reduced as the potential drop across Q22 increases. The circuit shown in FIG. 12 alleviates this problem by providing a further power supply, V15. The voltage supplied by V15 is lower than the supply voltage V13. This means that, if a voltage $V_{primary}$ was desired that would require $c_{V3}*V3$ to be smaller than V15 the circuit shown in FIG. 12 allows disconnecting the node shared by transistors Q66, Q68 and the transformer from V3 by applying an appropriate input signal to the gate of transistor Q66. The voltage source V15 can then be connected to the node shared by transistors Q66, Q68 and the transformer by applying an appropriate input signal to transistor Q68. In this case that output signal $V_{primary}$ can be expressed as $V_{primary}=c_{V15}*V15+n*V13$, wherein n is an integer that can take the values 0, 1, 2 or 3 and wherein $c_{V15}$ is a scaling factor smaller than 1 that reflects the attenuation of the potential applied to the common terminal of the primary winding of the transformer by Q68.

This arrangement compares favourable in terms of efficiency with the circuit shown in FIG. 11 as, in the FIG. 12 circuit output voltages requiring an attenuation of V13 (V3 in FIG. 11) to below V15 can be generated by replacing a heavily attenuated voltage supply from V13 with a less heavily attenuated voltage supply from voltage source V15.

It will be appreciated that the class G arrangement is not only useful in the transformer embodiments of FIGS. 9, 11 and 12. More generally the class G network shown in FIG. 12 is useful in any arrangement where a supply potential other than the ground potential is applied to one load terminal and a switched potential is applied to the other load terminal. This is, for example, the case in the circuit shown FIG. 2.

Figure 13:
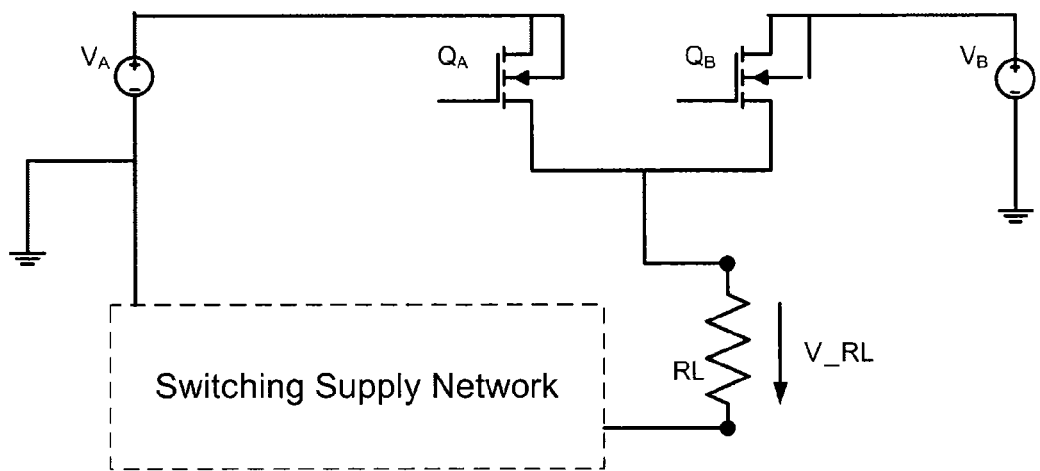
FIG. 13 illustrates a general principle underlying the use of the class G control element in FIG. 12.

In a further embodiment shown in FIG. 13 a series pass element $Q_A$ is provided in series with the unswitched supply potential $V_A$ and the load terminal (as opposed to the series pass element being provided in series between the switched output potential and the load as is the case in the circuit shown in FIG. 7). It will be appreciated that, in this embodiment the voltage applied across the load V_RL is $c*V_A-V_{switched}$, wherein c is a constant representing the attenuation of the supply voltage $V_A$, wherein $V_A \neq 0$ V and wherein $V_{switched}$ is the voltage supplied by the switching network indicated in dashed lines in FIG. 13. It will be appreciated that the switching network used in FIG. 13 can be any of the networks discussed above, wherein a direct connection between a power supply and the load is provided by the connections shown in FIG. 13.

As is the case for the circuit of FIG. 11, the circuit shown in FIG. 13 suffers from reduced efficiency as the value of c decreases. This problem is alleviated by the provision of the voltage source $V_B$ and the series pass element $Q_B$ and the same manner as discussed above with regard to FIG. 12. and similar efficiency gains as those discussed above with reference to FIG. 12 can be achieved.

It will be appreciated that the voltages supplied by the two power sources connected to the switching network (V13 and V14 of FIG. 12, for example) determines the voltages that can be stored in the capacitors in the switching networks. The stored voltage in turn determines the amount by which one of the supply voltages of the commonly connected power sources can be boosted. The voltages supplied by the two commonly connected power sources thus determine the difference between the potentials applied to one terminal of the load. In all of the above described embodiments with the exception of the embodiments shown in FIGS. 12 and 13 one of the supply voltages provided by the commonly connected power supplies is also (directly or via a series pass element) applied to another load terminal, with FIGS. 12 and 13 using a different power supply (V15 and $V_B$ respectively) at times. This supply voltage thus provides a reference voltage to the load against which the voltage drop across the load is formed.

As the above discussion relating to FIGS. 12 and 13 shows, situations exist where it is advantageous to replace the supply voltage provided to the load terminal from the commonly connected power supplies with a lower supply voltage (which may in turn be subject to attenuation by a series pass element), for example from voltage sources V15 and $Q_B$ in FIGS. 12 and 13 respectively. Thus far the description of embodiments has focused on supplementary power supplies V15/$V_B$ that provide a supplementary supply voltage that is lower than the supply voltage V13/$V_A$ supplied to the switching network. As will be appreciated from the above discussion, the supply voltage provided to the switching network determines the step width between the voltages applied to one of the load terminals. It is, however, not necessary for the voltage $V_B$ to be lower than the voltage $V_A$ and situations can be imagined where $V_B > V_A$ and where $V_B$ is connected to a load terminal and attenuated by $Q_B$ until the attenuated supplied voltage is as low as $V_A$. At this point $Q_B$ can be switched to disconnect $V_B$ from the load terminal and $Q_A$ can be enabled to connect $V_A$ to the load terminal The multilevel power supply architectures of the embodiments have been shown to provide increased efficiency. A standard class B amplifier with a sinusoidal input, for example, has an efficiency of 78.5%, whereas the efficiency of the circuit shown in FIG. 11 is 89%. It will be appreciated that the improvement relative to the class B amplifier is the greatest if signals with his PAPR are to be operated upon.

In embodiments a number of different voltages can be produced across a resistive load in a binary controlled fashion. The binary weighted switching reduces the number of power supplies required when compared to known multilevel power supplies without dramatically increasing the number of components.

It will be appreciated that, although MOSFETs are used in the above described embodiments, the use of such transistors is not essential and other transistor types or species (such as bipolar junction transistors or insulated gate bipolar transistors) or other form of switching devices can be used in practising the embodiments as long as the switching behaviour of the transistors described above with respect to the preferred embodiments is replicated.

If low power MOSFET switches are used fast switching speeds are achievable. This makes the architectures of the embodiments suitable for replacing class B or class G amplifiers in wideband split frequency envelope modulated amplifier architectures.

While certain embodiments have been described, the embodiments have been presented by way of example only, an area not intended to limit the scope of the inventions. Indeed, the novel methods, apparatus and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A multilevel power supply comprising first and second power sources, each power source having a first and a second voltage output, the second voltage output of the first power source connected to the first voltage output of the second power source to form a common node, a switching arrangement, a charge storage device and an output node, wherein the two power sources are configured to provide a first potential $V_1$, a second potential $V_2$ and a third potential $V_3$, wherein $V_1 > V_2 > V_3$, and wherein potential $V_1$ is provided on the first voltage output of the first power source potential, potential $V_3$ is provided on the second voltage output of the second power source, and potential $V_2$ is provided on the common node, the switching arrangement configured to charge the charge storage device between potentials $V_1$ and $V_3$ in a first switching state and to connect the charge storage device to the common node through the switching arrangement while bypassing the first and second power sources to connect the charge storage device between potential $V_2$ and the output node in a second switching state.

2. A multilevel power supply according to claim 1, wherein the switching arrangement is configured to connect the output node to potential V2 in a third switching state and/or to potential V1 or V3 in a fourth switching state.

3. A multilevel power supply according to claim 1, wherein the output node is a first stage output node, the multilevel power supply further comprising a second charge storage device with a second stage output node, wherein the switching arrangement is configured to, in a fifth switching state, connect the second charge storage device between the first and second stage output nodes when the first charge storage device is connected between potential $V_2$ and the first stage output node.

4. A multilevel power supply according to claim 1, wherein the output node is a first stage output, the multilevel power supply further comprising a second charge storage device with a second stage output node, wherein the switching arrangement is configured to, in a fifth switching state, connect the second charge storage device for charging between the first stage output node and potential $V_1$ or potential $V_3$ when the first charge storage device is connected between potential $V_2$ and the first stage output node.

5. A bipolar multilevel power supply comprising a first multilevel power supply according to claim 1 and a second multilevel power supply, wherein the architecture of the second multilevel power supply is symmetric with the architecture of the first multilevel power supply, wherein $V_3$ of the first multilevel power supply and $V_1$ of the second multilevel power supply are the same potential.

6. A bipolar multilevel power supply comprising:
a positive and a negative stage, each of the positive and the negative stage comprising a multilevel power supply according to claim 1 and a transformer with a secondary side connectable to a load, the transformer comprising a first, a second and a common terminal, wherein the first terminal is connected or connectable to the output of the positive stage and the second terminal is connected or connectable to the output of the negative stage and the common terminal is connected to potential $V_1$ or $V_3$.

7. A multilevel power supply according to claim 1, further comprising a variable attenuator in series with an output.

8. A multilevel power supply according to claim 7, comprising a further power source and a further variable attenuator between the said output and the further power source.

9. A multilevel power supply according to claim 8, further comprising a driver circuit configured to supply a driving signal to the attenuator and/or to the further attenuator, the driving signal for adjusting the amount of attenuation provided by the attenuator.

10. A multilevel power supply according to claim 1, wherein the switching arrangement comprises MOSFETs.

11. A multilevel power supply according to claim 1, further comprising a signal source configured to supply binary signals to switches within the switching device.

12. A base station or transmitter comprising a multilevel power supply according to claim 1.

13. A method of generating multiple power output levels in a multilevel power supply comprising first and second power sources, each power source having a first and a second voltage output, the second voltage output of the first power source connected to the first voltage output of the second power source to form a common node, the method comprising:
charging a first charge storage device by connecting it between a first potential $V_1$ provided at the first voltage output of the first power source and a second potential $V_3$ provided at the second voltage output of the second power source; and
subsequently connecting the first charge storage device to the common node through the switching arrangement while bypassing the first and second power sources to connect the charge storage between a third potential $V_2$ provided at the common node and an output node;
wherein $V_1 > V_2 > V_3$.

14. A method according to claim 13, wherein the output node is a first stage output node, the method further comprising:
charging, in one switching state, a second charge storage device between $V_1$ and $V_3$ and/or, in another switching state, between a potential generated at a terminal of the first charge storage device connected to the output when another terminal of the first charge storage device is connected to V2 and either of $V_1$ and $V_3$; and
connecting the second charge storage device in series with the first charge storage device between $V_2$ and a second stage output node.

* * * * *